United States Patent [19]

Beck et al.

[11] Patent Number: 4,482,929
[45] Date of Patent: Nov. 13, 1984

[54] MAGNETIC RECORDING DISK CARTRIDGE

[75] Inventors: John L. Beck, Byron; Randy J. Bornhorst, Rochester; Donald J. Smith, Byron; Michael N. Zell, Olmsted County, all of Minn.

[73] Assignee: International Business Machines Corporation, Armonk, N.Y.

[21] Appl. No.: 391,060

[22] Filed: Jun. 22, 1982

[51] Int. Cl.³ .............................................. G11B 23/02
[52] U.S. Cl. ..................................... 360/133; 360/128
[58] Field of Search ................................. 360/97–99, 360/133, 86, 128

[56] References Cited

U.S. PATENT DOCUMENTS

| | | | |
|---|---|---|---|
| 3,416,150 | 12/1968 | Lindberg, Jr. | 360/133 X |
| 3,668,658 | 6/1972 | Flores et al. | 360/133 |
| 3,845,502 | 10/1974 | Paus | 360/86 |
| 3,864,755 | 2/1975 | Hargis | 360/133 |
| 4,038,693 | 7/1977 | Huffine et al. | 360/99 |
| 4,149,207 | 4/1979 | Porter, Jr. et al. | 360/133 |
| 4,263,634 | 4/1981 | Chenoweth et al. | 360/133 |
| 4,392,170 | 7/1983 | Okada | 360/133 |

Primary Examiner—John H. Wolff
Attorney, Agent, or Firm—Francis A. Sirr

[57] ABSTRACT

A flexible magnetic recording disk is nonremovably enclosed in a rigid jacket. A wall of the rigid jacket includes a movable wall-piece which operates as a disk cleaning member. The disk is clamped to a spindle/collet drive assembly while the disk cleaning member is spaced from the adjacent surface of the disk. Only after clamping has been accomplished is the disk subjected to the friction force of the cleaning member.

16 Claims, 14 Drawing Figures

MAGNETIC RECORDING DISK CARTRIDGE

TECHNICAL FIELD

This invention relates to the field of dynamic magnetic information storage or retrieval, and more specifically to a disk cartridge comprising a rigid jacket housing a flexible magnetic recording disk.

BACKGROUND OF THE INVENTION

The use of a floppy disk as rotating magnetic recording media is well known. More specifically, a single disk is known to be permanently encased in a protective jacket. The disk rotates within the jacket, as the jacket is held stationary.

While flexible diskette devices have proved to be very useful in the art, certain problems have been encountered. A flexible plastic jacket is provided to protect the disk, but its ability to do so is limited by the nature of the material from which the jacket is made. The disk can be dented when a sharp object falls on the envelope. Users have also wrapped the jacket and disk about a related computer printout, causing the flexible assembly to permanently warp. Another common problem is fingerprint oil on the disk's recording surface.

In addition, centering and clamping of the disk occurs while the disk is constrained somewhat from sideways movement. This can lead to poor centering, and/or damage to the disk in the vicinity of its central mounting opening. This same movement constraint can cause the disk's rotational torque requirement to change from one diskette to another, and/or can produce inconsistent head-to-disk compliance.

In its generic form, a prior art disk jacket includes two generally central apertures, located in aligned fashion, in the opposite flat surfaces of the jacket. These openings allow access to the disk's central aperture, so that the disk may be clamped and rotated within the stationary jacket. Other jacket openings or slots allow access for a magnetic transducing head(s) which reads or writes onto the magnetic recording layer(s) of the moving disk.

The disk may be clamped to a motor by means of a rigid hub which is permanently attached to the disk. However, for economic reasons it is preferred that the disk drive include a spindle and collet which close onto and clamp the flexible disk media at the location of the disk's central aperture.

The art of floppy disk rotating magnetic memory or recording devices has long recognized the need to include a means for cleaning the disk as it rotates within its stationary jacket.

U.S. Pat. No. 3,668,658 is exemplary. This patent shows a flexible disk permanently enclosed in a protective flexible cover, envelope or jacket. In this patent the two inner jacket surfaces, which confront the opposite planar surfaces of the flexible disk, include a solid, porous, antistatic cleaning material. This material is in continuous frictional contact with the adjacent surfaces of the disk. As the disk rotates, this material operates to clean the disk. This patent also suggests the use of a head load-unload pinch pad which pinches the flexible outer surfaces of the jacket together to provide additional disk cleaning action by the jacket's inner porous layers. U.S. Pat. No. 4,038,693 shows such a pinch pad, which is force-loaded into the side of the flexible disk jacket only after the disk has been centered and clamped by the disk drive's spindle/collet mechanism.

The disk/jacket assembly of aforementioned U.S. Pat. No. 3,668,658 is a flexible assembly, i.e. neither the disk nor its jacket is rigid.

A form of rigid assembly is shown in U.S. Pat. No. 3,864,755 wherein a flexible disk is encased within a jacket formed of a relatively rigid, flat, first cover, to which a thin second cover is deformed, to provide a cavity coextensive with the circumferential outer edge of the flexible disk. This cavity is fully lined by two wiper layers which always engage the opposite flat surfaces of the disk.

The concept of placing a flexible disk in a protective rigid jacket having two rigid walls is shown, for example, in U.S. Pat. No. 4,149,207. In this patent the flexible disk integrally carries a drive hub; whereas, in the former patents the drive interface to the disk is formed by releasably clamping the flexible disk material itself.

This later patent provides a relatively thick cavity for the disk. A pair of oppositely disposed, protruding wiper elements continuously engage the opposite planar surfaces of the disk, and thus the disk tends to be maintained centered within this thick cavity.

Copending and commonly assigned U.S. patent application Ser. No. 343,635, filed Jan. 28, 1982, now abandoned, also discloses a flexible disk placed in a protective rigid jacket having two rigid walls. In this device, the two rigid jacket halves are identical in that both contain a head access opening and both contain a 90° displaced, internally projecting boss which controls a disk cleaning material on its upper surface. When the two jacket halves are assembled, the access openings are 90° displaced from each other. The boss of one jacket half is then opposite the access opening of the other jacket half, and both sides of the disk are wiped, as each boss provides a pressure force for a magnetic head.

In known prior art, where the relatively fragile flexible disk material is itself clamped to the disk drive's spindle/collet mechanism, the construction and arrangement either provides no cleaning capability, or when cleaning is provided, the cleaning means continuously engages the disk, and prevents free sideways movement of the disk during clamping.

This lack of free disk movement during clamping can result in damage to the relatively fragile disk in the vicinity of its central opening. In addition, inaccurate centering of the disk about the drive's spindle may occur. It is conventional in disk drives of the floppy disk type to merely position the head where a disk track should be—and where the track will be if the disk is accurately centered. As a result of the aforementioned lack of free disk movement during clamping, the disk tracks may be mislocated relative the disk drive's head.

SUMMARY OF THE INVENTION

The present invention provides a rigid jacket/flexible disk cartridge wherein the disk is free to move sideways during clamping, and only thereafter is a cartridge cleaning surface moved against the disk's planar surface.

More specifically, the rigid cartridge of the present invention provides a relatively thick cavity which loosely houses a flexible magnetic recording disk in its flat state. At least one rigid cartridge wall includes a movable disk-cleaning surface which is normally spaced away from the disk. Thus, when the cartridge is placed in a disk drive, the disk drive's spindle/collet mechanism first operates to center and clamp the disk to the drive motor. Due to the construction and arrangement of the present invention, the flexible disk is entirely free to move during centering and colleting. That is, no force resists disk lateral movement which may be necessary during this centering/colleting operation. As a result, distortion and/or damage to the disk is minimized, and the disk's data tracks are accurately centered to the drive's disk-rotation-axis.

Once the disk is properly centered and colleted, a pin moves into engagement with the jacket's movable disk-cleaning surface; thus operating to move this jacket surface into cleaning engagement with the disk.

The location of the jacket's disk-cleaning surface, relative the head-receiving slot, is not critical to the present invention.

When the disk and its disk drive are constructed and arranged for double side recording, a head-receiving slot is provided on each side of the cartridge.

In one embodiment of the present invention the cartridge's rigid outer housing is formed of two rigid plastic members, one of which includes a movable cleaning member which is pressure-flexed into the disk by virtue of a hinge-like reduction in thickness of a portion of the outer housing.

In another embodiment, the movable cleaning member is a loose, rigid plastic piece. This piece is loosely held in place by overhanging walls and internally projecting, fence-like walls, which prevent the piece from leaving its proper position in the cartridge's plastic external wall, but yet allows the piece to be pressed against the disk, in cleaning cooperating therewith.

The foregoing and other features and advantages of the invention will be apparent from the following more particular description of preferred embodiments of the invention, as illustrated in the accompanying drawing.

DESCRIPTION OF THE PREFERRED EMBODIMENTS

Figure 1:
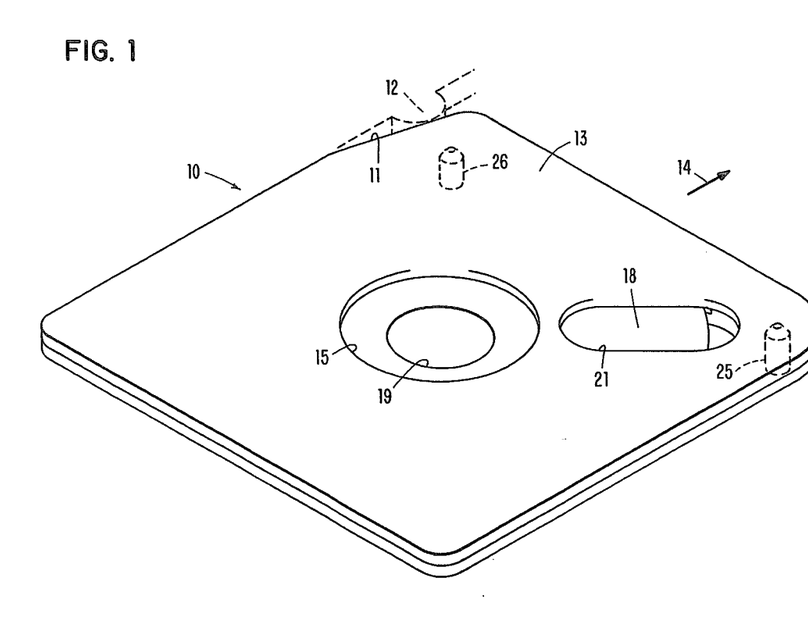
FIG. 1 is a top view of the rigid magnetic recording disk cartridge of the present invention.

The rigid magnetic recording disk cartridge of the present invention is essentially a rigid plastic envelope, preferably formed of an opaque polycarbonate. While its dimensions are not a limitation on the present invention, the cartridge is about 0.5 cm thick and 10 cm square. A top view is seen in FIG. 1, although the designation top and bottom are arbitrary since the cartridge can be used with its flat plane oriented in any direction.

Cartridge 10 is essentially square, with the exception of a tapered boundary edge 11. This edge is constructed and arranged to cooperate with a stationary wall portion 12 of the disk drive with which the cartridge is used. Edge 11 and wall portion 12 cooperate so that the cartridge cannot be incorrectly inserted in the drive, as the cartridge moves in direction 14.

Figure 7:
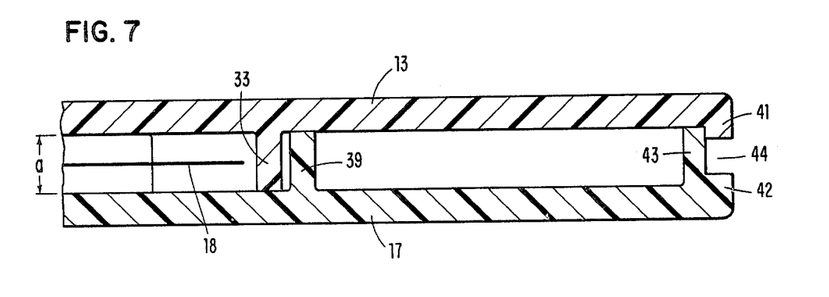
FIG. 7 is a partial section view of the two cartridge halves, as they join to form the peripheral boundary of the two halves.

The cartridge's flat top wall 13 includes a centrally located circular aperture 15 which is aligned with a similar aperture 16 (FIG. 2) formed in the cartridge's flat bottom wall 17. These two apertures receive the disk drive's stationary spindle and movable collet. A flexible magnetic recording disk 18 of the well known "floppy" type is loosely captured within the cartridge's inner cavity. This disk is of thin flexible magnetic recording media, and includes a central, circular, mounting aperture 19 whose peripheral boundary is clamped to the disk drive's collet/spindle mechanism. When so clamped, the disk's circular data tracks are concentric with the central axis of aligned apertures 15, 16, and the disk spins about this axis, as it assumes a flat spin-plane perpendicular to this axis, as seen in FIG. 7.

The cartridge's two opposing walls 13 and 17 include aligned openings or slots 21 and 22, respectively. These slots enable the disk drive's magnetic head(s) to obtain access to the disk's data tracks. As is well known, floppy disk drives may have but a single head, or may have two such heads, one located on each side of the disk. In the event that a single head is used, it preferably enters aperture 22 formed in the bottom of the cartridge, and a felt-like pressure pad enters aperture 21. In this way, the spinning disk is trapped between the pad and the head. In a preferred construction, the head backup pad spans substantially the entire disk-radial distance of aperture 21, and the opposing head incrementally moves on the disk-radius of aperture 22, as the pad remains stationary. This head/pad arrangement is described in copending and commonly assigned application Ser. No. 82,447 filed Oct. 9, 1979, now U.S. Pat. No. 4,315,289 incorporated herein by reference.

Slots 21 and 22 are about 1.5 cm wide and 3 cm long. It has been found that this size slot, in combination with the cartridge's 1.5 cm thickness, substantially prevents physical contact with the recording surface(s) of disk 18, even when the operator inadvertently grabs the cartridge in the general location of slots 21 and 22.

As mentioned, the common central axis of apertures 15 and 16 defines the spin axis of disk 18. Only when disk aperture 19 is concentric with this axis will the disk's data tracks be properly located, as the disk drive's head moves to transduce a given data track. While track following servo techniques can be used to follow the data tracks of an improperly located disk, it is preferred that less expensive open-loop positioning of the head be employed.

Figure 3:
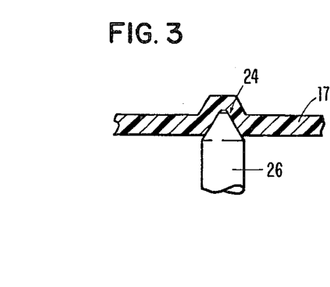
FIG. 3 shows the manner in which a cartridge wall opening cooperates with a disk-drive-mounted pin, to properly locate the cartridge within the disk drive.

For this reason, it is best that a means be provided to accurately locate the common central axis of cartridge apertures 15 and 16 within the disk drive. This is accomplished by a round, tapered-wall hole 23 and a tapered-wall slot 24 formed in the cartridge's bottom half 17. The disk drive is provided with a stationary tapered post 25 (FIG. 1) and a stationary tapered post 26 (FIGS. 1 and 3). When cartridge 10 is properly located within the disk drive, pin 25 enters hole 23, and the cartridge rotates slightly about pin 25, as tapered post 26 centers itself on the tapered walls of slot 24; see FIG. 3.

Figure 2:
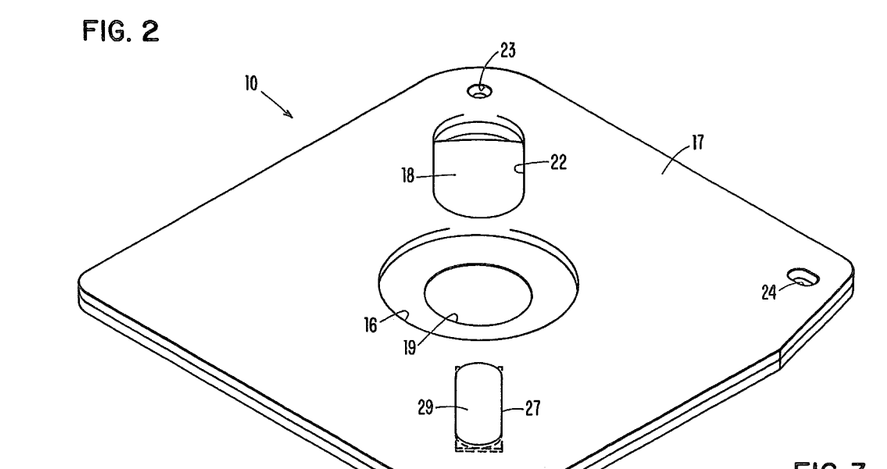
FIG. 2 is a bottom view of this cartridge.
Figure 5:
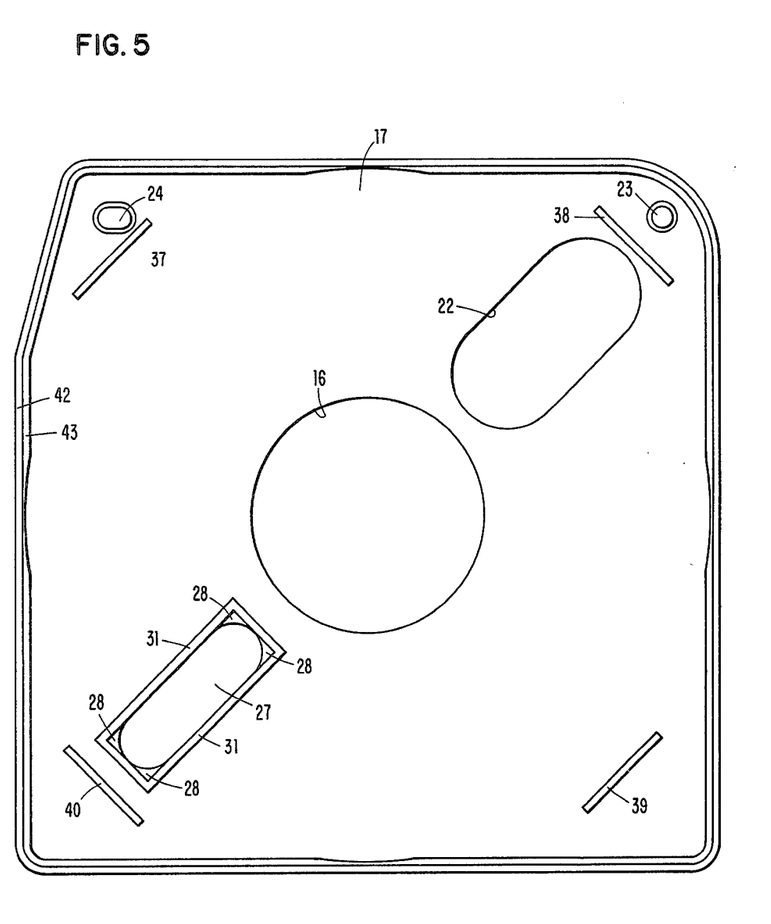
FIG. 5 is a view of the inside of the bottom half of the cartridge.
Figure 6:
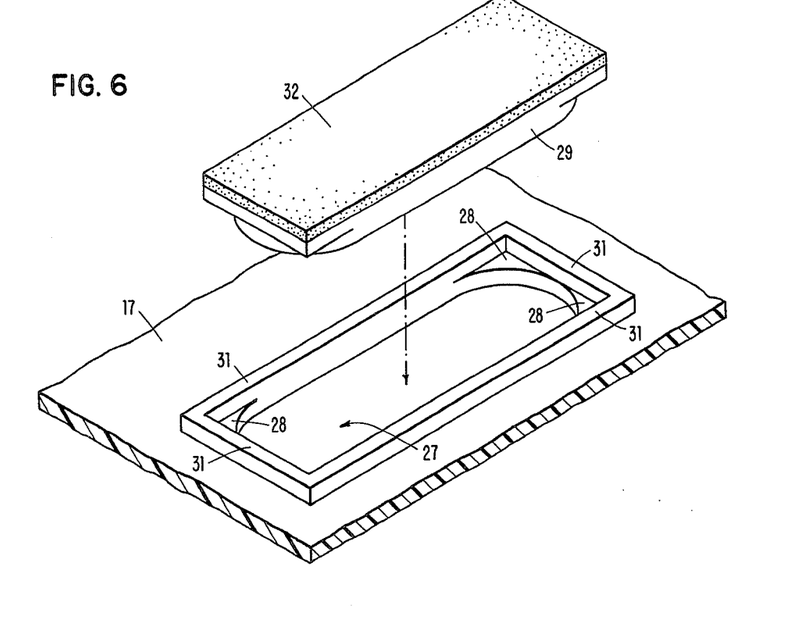
FIG. 6 is a view of that portion of the cartridge's bottom half which includes a movable cleaning member.

In one embodiment of the present invention the cartridge's bottom wall 17 includes an aperture 27 which is 180° displaced from head-access-opening 22. As seen in FIGS. 5 and 6, the four aperture corners 28, which are in the plane of the outer cartridge surface 17, overhang the square corners of the aperture, as viewed internally of the cartridge. A plastic housing piece 29 is trapped within aperture 27 and operates as the aforesaid disk cleaning member. As best seen in FIG. 6, the lower surface of housing piece 29 is flush with the exterior lower surface of the cartridge, and thus aperture 27 is completely closed by piece 29, as seen in FIG. 2. The four wall portions 28 constrain piece 29 so that it cannot fall out of aperture 27.

FIGS. 5 and 6 also show that the internal boundary of aperture 27 is surrounded by an upstanding wall or fence 31 which prevents piece 29 from moving out of aperture 27 into the interior of the cartridge.

In one embodiment cleaning member or piece 29 carries a porous, low friction dusting fabric or pad 32 bonded to its entire interor surface. This pad spans a radial distance of the disk which is at least coincident with the portion of the disk which carries the aforesaid data tracks, and is normally spaced away from the spin-plane of disk 18.

In another embodiment (FIG. 9) piece 29 does not include pad 32, but rather a full fabric liner 46 is provided.

Advantageously, top half 13 (FIG. 4) includes a slightly raised surface 55 which cooperates with the bottom half's movable cleaning member. Surface 55 extends only slightly above the interior surface of top half 13 and operates to support its cleaning fabric (45 of FIG. 8) in contact with the adjacent disk surface when the bottom half's cleaning member is force-loaded into the opposite side of the disk.

Figure 4:
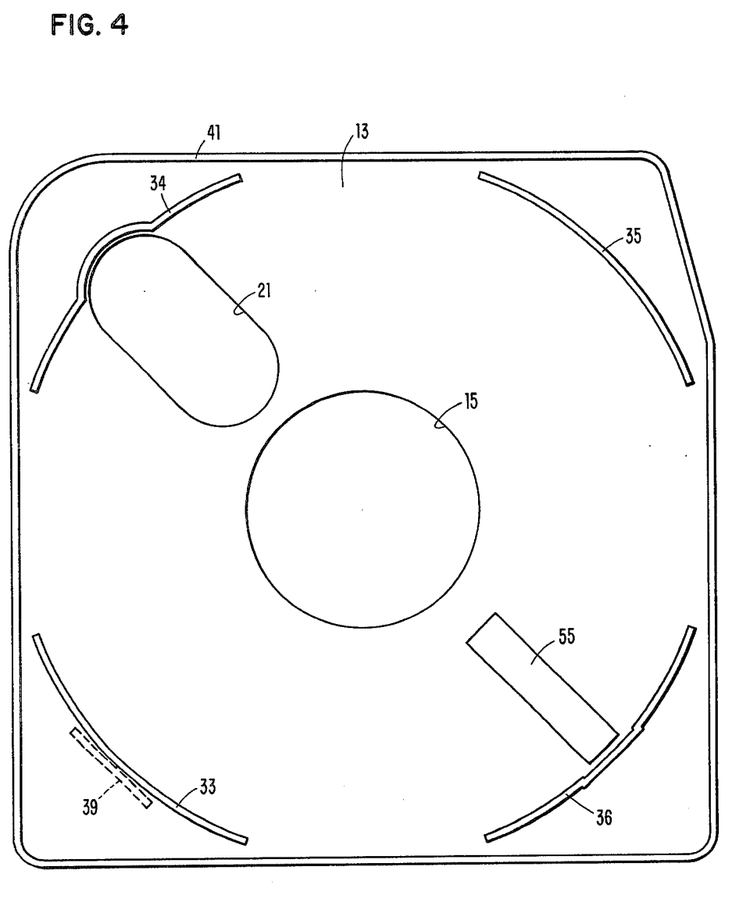
FIG. 4 is a view of the inside of the top half of the cartridge.

With reference to FIGS. 4, 5 and 7, the internal views of cartridge top half 13 and bottom half 17 show that top half 13 includes four upstanding walls 33, 34, 35 and 36 which define a disk-receiving cavity having a circular boundary. These four walls are flat on top, and extend upward so as to snugly fit against the interior flat surface of bottom half 17, when the two halves are assembled together.

Bottom half 17 also includes four upstanding walls 37, 38, 39 and 40. These walls are generally of the same height as walls 33-36, but they are spaced a greater distance from the common center of apertures 15, 16 than are walls 33-36. As a result, the top surfaces of walls 37-40 snugly engage the inner surface of top half 13, when the two halves are assembled together. Due to the greater radial spacing of walls 37-40, these walls engage the interior surface of the top half outside of the disk cavity defined by walls 33-36 (see FIGS. 4 and 7). Walls 37-40 provide a means whereby the two cartridge halves are joined together, preferably by ultrasonic welding, in a manner which insures that no debris or the like will be produced in the disk cavity, and no flash or the like will be left on the periphery of the disk cavity. To facilitate ultrasonic welding, the top surfaces of walls 37-40 contain a knife edge which causes walls 37-40 to be slightly higher than walls 33-36 prior to welding, and to be reduced to the same height after welding.

The dotted outline 39 of FIG. 4 shows the relative position of the four upstanding walls of each cartridge half, once the two halves are assembled.

Top cartridge half 13 (FIGS. 4 and 7) includes an upstanding boundary wall 41 which completely encircles the cartridge. The height of wall 41 is less than the height of walls 33-36, as can be seen in FIG. 7.

Bottom cartridge half 17 also includes an upstanding boundary wall. However, in this case the wall includes a first low portion 42 and a second high portion 43. As can be seen in FIG. 7, the height of wall portion 42 generally equals the height of portion 41. Thus, a center-located recess 44 encircles the edge of the cartridge. The height of wall portion 43 equals the height of wall portions 37-40, and as a result, wall portion 43 engages the inner surface of top cartridge half 13 just inward of that cartridge half's border wall 41. Thus, the edge of the cartridge is nicely sealed.

Parts of wall portion 43, located at the four corners of the cartridge, are provided with an upstanding knife edge in order to concentrate the energy of ultrasonic welding. After welding, the height of these upstanding portions are reduced, such that wall portion 43 appears as seen in FIG. 7.

With reference to FIG. 7, the two internal, cavity forming surfaces of cartridge halves 13 and 17 are separated by a distance "a" equal to about 2.2 millimeters (mm). Each of these internal walls is preferably lined with a disk-shaped cleaning member (members 45 and 46 of FIGS. 8 and 9, respectively). These cleaning members are about 0.25 mm thick. Disk 18 is about 0.075 mm thick. The height of wall 31, FIG. 6, above adjacent internal surface 17 is about 0.6 mm. The inner flat surface of member 29 (absent pad 32 of FIG. 6) is about flush with the top of wall 31. The height of raised surface 55, FIG. 4, above adjacent internal surface 13 is about 0.3 mm.

Figure 8:
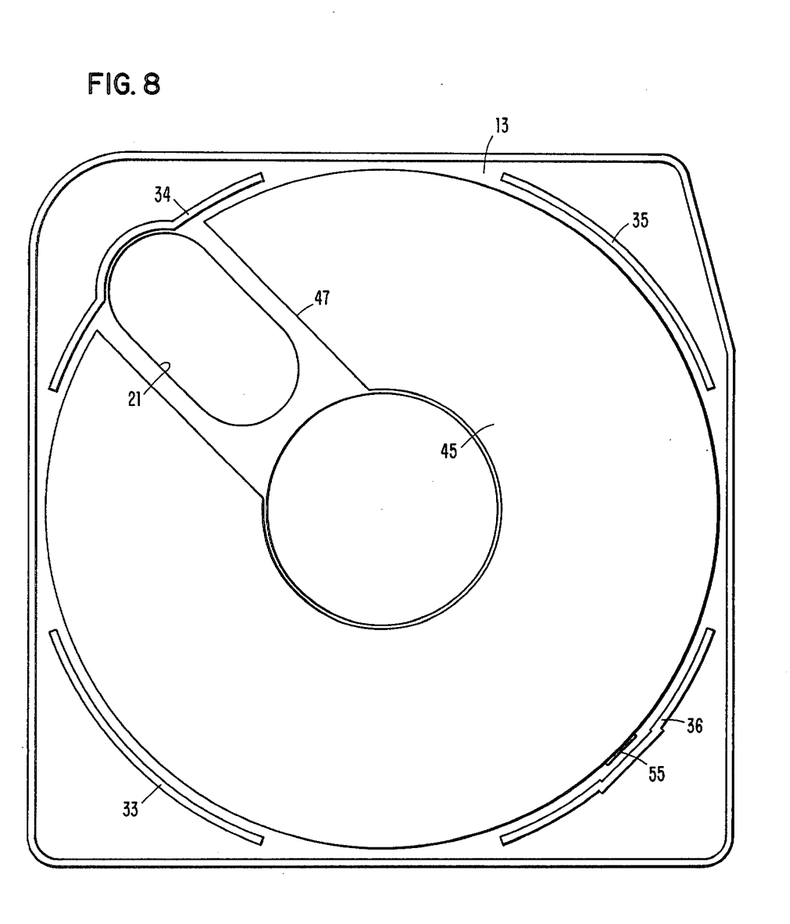
FIG. 8 is a view like FIG. 4, showing a dusting fabric liner which is attached to the top-half wall of the cartridge's disk-holding cavity.
Figure 9:
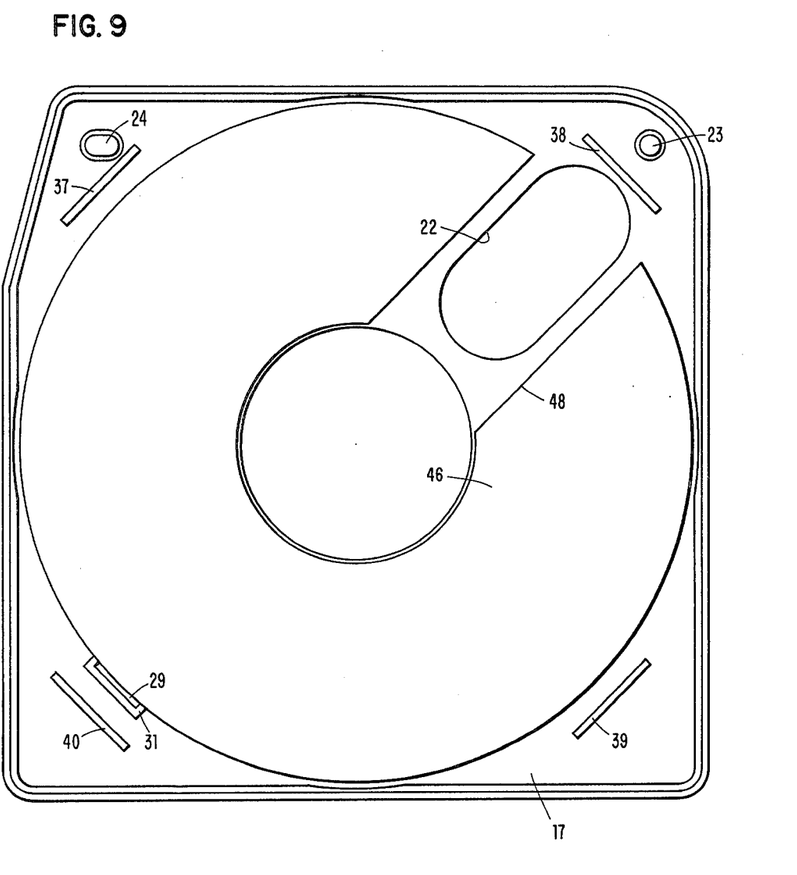
FIG. 9 is a view like FIG. 5, showing a dusting fabric liner which is attached to the bottom-half wall of the disk-holding cavity.

FIGS. 8 and 9 are similar to FIGS. 4 and 5, respectively, with the exception that cleaning piece 29 is shown in position in FIG. 9, and in that both figures show the two interior, parallel, disk cavity walls lined with a stationary, porous, low friction dusting fabric 45 and 46, in generally disk form. These two fabric disks are glued or heat-stacked to the inner surfaces of cartridge halves 13 and 17, for example by the use of a matrix of glue dots.

An exemplary dusting fabric is manufactured by The Kendall Company and is designated Kendall 9030. The functioning of such a fabric in a flexible cartridge for a flexible disk is described in aforesaid U.S. Pat. No. 3,668,658.

Advantageously, a uniform thickness, flat, thin layer of electrically conductive, nonporous material may be interposed between the inner plastic surface of the cartridge half and the fabric disk halves, as by vacuum deposit of a metal, in accordance with the teachings of U.S. Pat. No. 4,038,693, incorporated herein by reference. In addition, it may be desirable to impregnate each of the fabric disk halves 45 and 46 with an antistat material.

Slots 47 and 48 which are formed in the fabric disks are wider than the mating cartridge slots or apertures 21 and 22, respectively, to thereby prevent loose fabric fibers from extending into the cartridge slots, as taught by U.S. Pat. No. 4,263,634.

In the embodiment of FIG. 9, fabric 46 is not glued in the general vicinity of wall 31. Thus, loose wall piece 29 can operate to push the fabric against the disk surface, as aforesaid.

Figure 10:
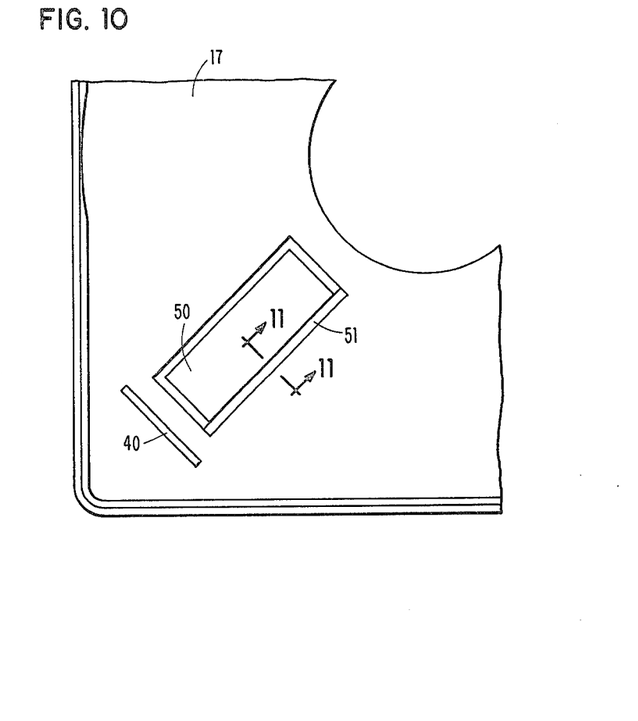
FIGS. 10 and 11 are partial views of an alternative form of cartridge bottom half.
Figure 11:
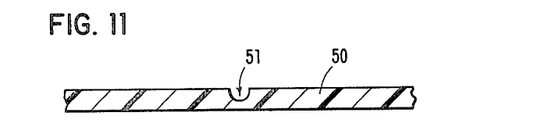

An alternate form of the present invention is shown in FIGS. 10 and 11. In this arrangement, bottom cartridge half 17 carries a movable disk cleaning member 50 integrally therewith. In this case, member 50 can be forced out of the plane of the cartridge half by virtue of a reduced-thickness hinge 51 which is molded into flat surface 17. When the cartridge half is so constructed, the mating disk of cleaning fabric again is not glued in the area of member 50 and hinge 51, so that inward movement of member 50, into its disk-cleaning position, forces that portion of the fabric against the spin-plane of disk 18.

Figure 12:
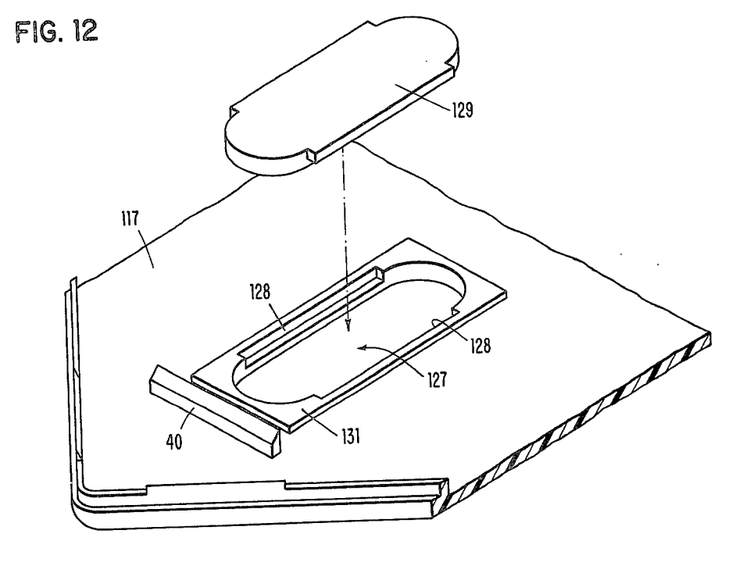
FIG. 12 is a view like FIG. 6, showing an alternate form of the cleaning piece.

Another alternate form of bottom cartridge half 117 is shown in FIG. 12, where aperture 127 is again surrounded by a fence-like wall 131. Wall 131 also extends about 0.6 mm above the adjacent internal surface 117. In this embodiment of the present invention, wall 131 includes two recesses which define overhanging walls 128. Walls 128 are flush with the cartridge's external surface, and are recessed from the top of wall 131 so as to trap mating plastic piece 129 within the assembled cartridge. The inner surface of piece 129 is again flush with the top of wall 131 when piece 129 is in place, and piece 129 includes extending tabs which mate with the two recesses in wall 131.

Figure 13:
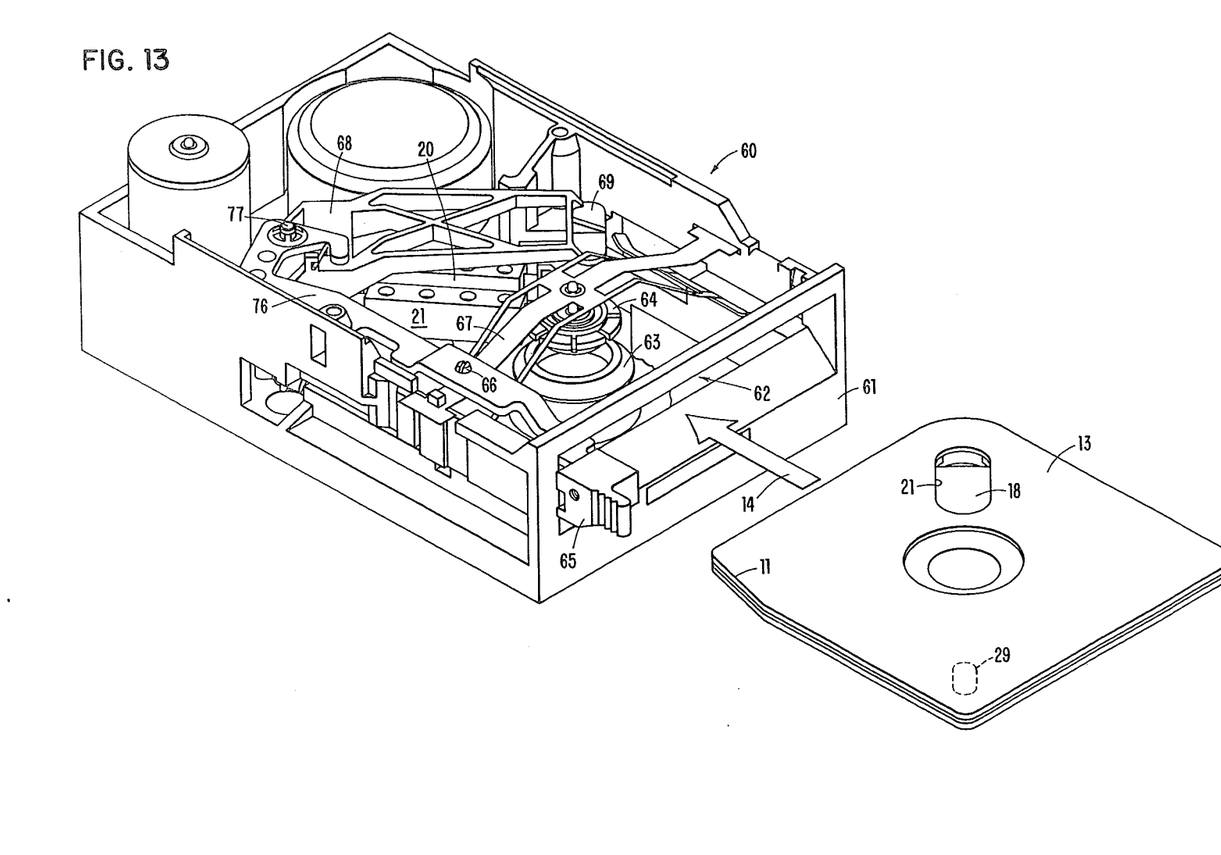
FIG. 13 shows the aforesaid cartridge prior to insertion in an exemplary flexible disk drive.

FIG. 13 shows the aforesaid cartridge prior to insertion into a flexible disk drive 60 with which it will be used. The disk drive includes a front decorative panel 61 which includes a slot 62 adapted to receive the cartridge. Spindle 63 and collet 64 operate to clamp disk 18, as collet 64 lowers onto the spindle due to operation of manual handle 65. Movement of handle 65 to the right causes arm 76 to pivot about pivot point 77. Movement of handle 65 to the right causes its member 66 to push down on the ramp portion 67 of a spring which supports the collet. Spindle 63 rotates by virtue of a motor, not shown, which is mounted on the bottom of the disk drive. In this manner, the closed spindle/collet assembly rotates about a disk spin axis which is normal to the flat spin plane of the disk.

Arm 68 carries a felt-like pad on the underside of its portion 69. This pad is lowered by operation of handle 65 such that the pad cooperates with cartridge aperture 21. Directly beneath this pad is a magnetic head, not shown, which moves parallel to the disk's spin plane, and generally on a radius of the disk. Copending and commonly assigned application Ser. No. 340,170, filed Jan. 18, 1982, is incorporated herein by reference since it shows the detail of the head mounting means, including support arms 70 and 71.

Movement of handle 65 to the right also operates to control a movable force member which engages and pushes upon cartridge member 29, 50 or 129, but only after the spindle/collet assembly has closed to clamp the disk. Likewise, arm 68 does not lower its pad onto the disk until the spindle/collet assembly has closed.

Figure 14:
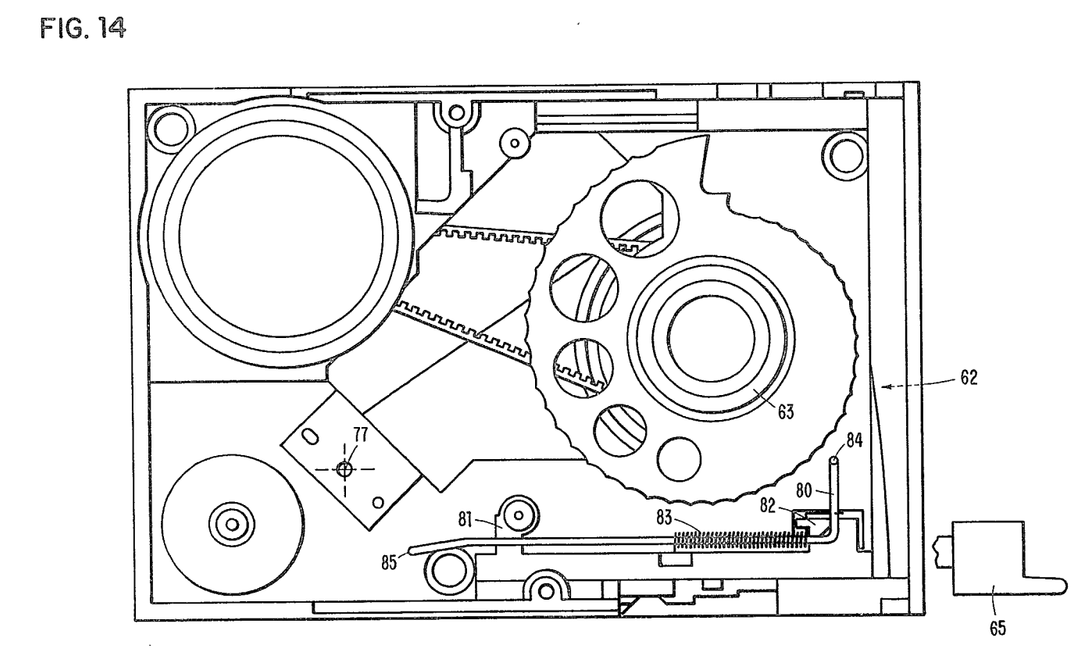
FIG. 14 is a top view of the disk drive, with certain parts removed.

FIG. 14 is a top view of the disk drive. Certain components have been removed in order to show movable force member 80 which actuates the cartridge's cleaning member. This force member comprises a bent metal rod which pivots on a horizontal axis defined by bearing blocks 81 and 82. Coil spring 83 encircles a midportion of the metal rod and biases a vertically upward extending end pin 84 to a position where pin 84 engages the cartridge's cleaning member and effects cleaning of the spinning flexible disk, as aforesaid. However, when handle 65 is in the position shown in FIG. 14, a cam surface (not shown) carried by the pivoted end of arm 76 (FIG. 13) engages a vertically downward extending end pin 85, thereby causing the metal rod to rotate clockwise (as viewed from the front), thereby lowering end pin 84 out of engagement with the cartridge's cleaning piece.

While the invention has been particularly shown and described with reference to preferred embodiments thereof, it will be understood by those skilled in the art that various changes in form and details may be made therein without departing from the spirit and scope of the invention.

What is claimed is:

1. A floppy disk cartridge comprising:
   a rigid housing having a pair of spaced walls defining a flat, substantially closed cavity, each of said walls including a through-hole, and at least one of said walls including a head-receiving aperture;
   a generally flat floppy disk nonremovably held within said cavity, said disk including a mounting aperture aligned with said through-holes, but smaller in dimension than said through-holes; and
   a rigid, but movable, disk-cleaning-member, located to form a part of said one wall, said cleaning member being normally spaced from said disk and, by virtue of being movable, being free to move into said cavity and into cleaning contact with said disk.

2. The disk cartridge of claim 1 wherein said disk-cleaning-member comprises a loose, rigid piece which cooperates with a cleaning surface on the side thereof facing said cavity, said one wall having a further aperture closed by said piece, said piece being constrained from movement in a direction out of said further aperture by confining surfaces formed in said one wall.

3. The disk cartridge of claim 2 wherein the surfaces of said one wall which constrain said piece overhang said further aperture to trap said piece in said further aperture.

4. The disk cartridge of claim 1 wherein said disk-cleaning-member comprises a rigid piece which cooperates with a cleaning surface on the side thereof facing said cavity, said piece being connected to said one wall by a reduced-thickness hinge.

5. The disk cartridge of claim 1, 2, 3 or 4 wherein the wall of said cavity opposite said one wall includes a stationary second disk cleaning surface, whereby both sides of the disk are cleaned when said movable disk-cleaning-member is moved into cleaning contact with said disk.

6. A system for recording and/or reading magnetic-flux information, comprising:
   a generally flat, planar disk of thin flexible magnetic recording media having a central mounting aperture and a number of data track positions concentric with said aperture;
   a rotatable collet member for mechanically clamping the disk's central mounting aperture in order to rotate the disk on an axis concentric with said central mounting aperture;
   a recording and/or reading head movable to locations coincident with selected data track positions of a properly clamped disk;

a generally flat disk cartridge in the form of a rigid envelope having a generally flat, closed cavity which is thicker than said thin disk, said disk being loosely housed within said cavity;

said cartridge having:

first and second relatively flat, rigid, spaced walls parallel to the plane of said disk and forming opposite internal wall surfaces of said cavity;

wall means joining the peripheral boundary of said first and second walls to thereby define said envelope;

aligned clamping apertures in said first and second walls, said clamping apertures being of a size to expose the disk area surrounding the disk's mounting aperture;

at least one of said first and second walls including a movable disk-cleaning-member which is normally coextensive with said one wall, said disk-cleaning-member being movable into cleaning contact with said disk; and a movable force member, operable after said collet member has clamped said disk, to move said disk-cleaning-member into cleaning contact with said disk.

7. The system defined in claim 6 wherein said movable disk-cleaning-member comprises a loose, rigid, flat piece which cooperates with a cleaning surface located on the side thereof facing said disk, said one wall having a further aperture closed by said flat piece, and wall means preventing movement of said flat piece out of said further aperture.

8. The system defined by claim 7 wherein said one wall overhangs said flat piece to trap said flat piece in said further aperture.

9. The system defined by claim 6 wherein said movable disk-cleaning-member comprises a movable portion of said one wall which is connected to said one wall by a reduced-thickness hinge, and a cleaning surface mounted on the side of said movable portion which faces said disk.

10. The system defined by claim 6, 7, 8 or 9 wherein the internal surface of the other wall which faces said cavity includes a second stationary disk cleaning surface, whereby both sides of said disk are adapted to be cleaned by operation of said movable force member.

11. A protective rigid jacket nonremovably holding a thin, flat, flexible disk of magnetic recording media, while facilitating access to the media for clamping of the media to a rotational prime mover, and also facilitating access to the media by a magnetic transducing head, comprising:

a pair of flat, rigid, wall members comprising said rigid jacket, said wall members having facing surfaces which are spaced to define a relatively thick cavity;

a flexible disk of magnetic recording media loosely held in said cavity;

a first porous, low friction dusting fabric lining the facing surface of one of said wall members;

a second porous, low friction dusting fabric lining the facing surface of the other of said wall members; and a movable wall piece located on one of said wall members;

whereby movement of said movable wall piece traps said disk between said first and second dusting fabrics.

12. A floppy disk cartridge comprising:

a generally square, thin and rigid housing including first and second spaced walls having facing internal surfaces which define a flat, substantially closed cavity, each of said walls including a centrally located through-hole, and at least one wall including an elongated head-receiving aperture which is located along a diagonal axis of said housing;

a generally flat floppy disk, nonremovably held within said cavity, said disk including a mounting aperture aligned with said through-holes, but smaller in dimension than said through-holes; and an elongated, rigid, movable disk-cleaning-member formed as part of said one wall, and located along said diagonal axis on the opposite side of said through-holes from said head-receiving aperture, said cleaning member being normally spaced from said disk, and being movable into said cavity and into cleaning contact with said disk.

13. The disk cartridge of claim 12 wherein said disk-cleaning-member comprises a loose, rigid housing piece which cooperates with a cleaning surface which is located on the side of said housing piece which faces said cavity, said one wall having a further aperture closed by said housing piece, said housing piece being constrained from movement out of said further aperture by confining surfaces formed in said one wall.

14. The disk cartridge of claim 13 wherein the confining surfaces of said one wall overhang said further aperture to trap said piece in said further aperture.

15. The disk cartridge of claim 14 wherein the internal surface of said other wall, opposite said disk cleaning member, includes a stationary second disk cleaning surface, whereby both sides of the disk are cleaned when said movable disk-cleaning-member is moved into cleaning contact with said disk.

16. The disk cartridge of claim 15 wherein said housing includes a leading edge adapted to be first inserted into a disk drive, and a notch formed in one corner of said leading edge to insure correct insertion of said cartridge into the disk drive.

* * * * *